July 29, 1941.   T. W. KIRKMAN   2,251,058
CHEMICAL EVAPORATOR
Filed May 17, 1939   2 Sheets-Sheet 1
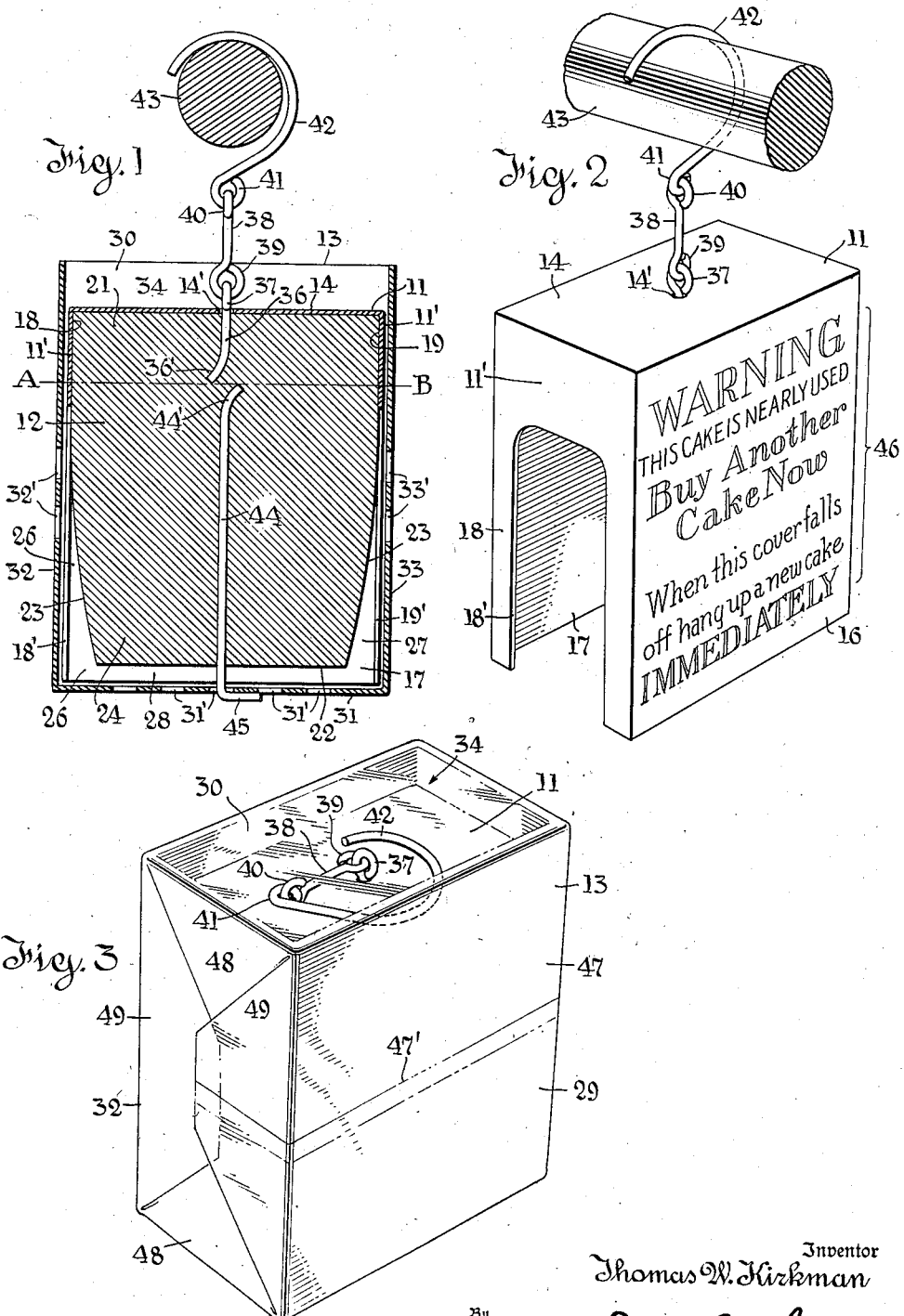
Inventor
Thomas W. Kirkman

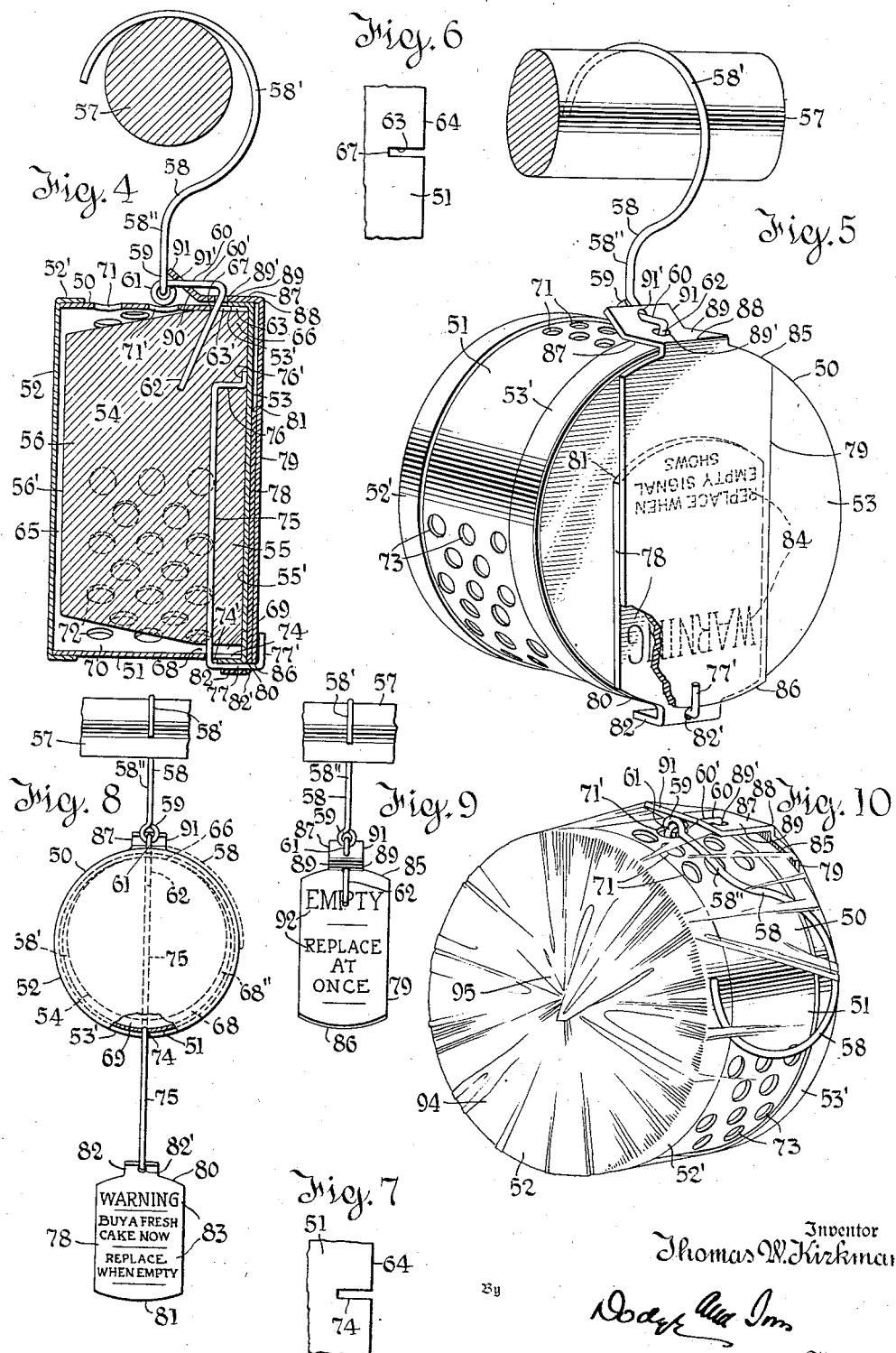

Patented July 29, 1941

2,251,058

UNITED STATES PATENT OFFICE 2,251,058

CHEMICAL EVAPORATOR

Thomas W. Kirkman, New York, N. Y.

Application May 17, 1939, Serial No. 274,276

13 Claims. (Cl. 299—24)

The present invention relates to chemical evaporators and especially to devices of this character which are adapted for insecticidal, fumigating, deodorizing, disinfecting and like purposes.

More specifically, the invention pertains to a chemical evaporator of the type which includes a container, means for supporting or suspending the evaporator upon a convenient object when in use, a chemical cake located in the container and adapted to vaporize due to exposure to the air so as to produce the desired insecticidal or other fumes or gases, and venting means for the container whereby air may contact with the chemical cake to evaporate the same and the resulting fumes may freely escape from the device into the surrounding space which is being protected or treated, such for instance as a clothes closet, a room, etc. Inasmuch as this type of evaporator device is intended to emit the desired fumes practically continuously while in use in order properly to serve its purpose of providing substantially uninterrupted protection or treatment, it is necessary immediately upon complete exhaustion of the evaporable or volatile chemical cake either to replace the evaporator with another evaporator having a cake therein or to replace the used cake with another cake.

In the known forms of the above type of evaporator, when it is desired to ascertain whether the chemical cake is completely or almost completely evaporated, it is necessary either to go to the trouble of opening the container for inspection purposes or to endeavor to observe the condition of the cake through the gas and air vent apertures in the container. The latter procedure is objectionable because, even should the vent apertures be sufficiently large and the cake so located as to permit observation through the apertures of a recently inserted cake, it is difficult if not impossible to see the cake through these apertures after a substantial portion of the cake has evaporated, especially when inspection is made under adverse lighting conditions.

Frequently, under the above circumstances the user of the device assumes or risks the chance that a portion of the chemical cake still remains in the evaporator and is thus supplying the desired fumes to the surrounding space, when as a matter of fact the cake has completely evaporated. The empty evaporator is therefore left in place and, since often a considerable time elapses before the user finally ascertains that the cake is completely exhausted, there results a prolonged period during which the evaporator is not performing its protecting or fumigating function.

It is the purpose of the present invention to provide an improved chemical evaporator of the type referred to in which the above-mentioned objections have been eliminated by so constructing and arranging the device that, as a result of evaporation of the chemical cake, the device furnishes a readily-observable and definite signal or indication that the cake is completely exhausted immediately when such exhaustion takes place. The user is thereby promptly notified that the device is empty and hence it is time either to replace the old evaporator with a new one having a cake therein or to replace the used cake with another cake. Such action being taken promptly, there is thus avoided any substantial period during which the chemical evaporator is not operating to perform its intended function.

A further important object of the improved chemical evaporator is the provision of means, actuated as a result of evaporation of the chemical cake, to furnish a readily-observable and definite signal or indication that the cake is nearly or almost completely used up immediately when such condition exists. In this manner the user is given a warning or preliminary notice or signal before the cake is completely dissipated. Opportunity is thus afforded for the purchase of another cake or another evaporator having a cake therein, so that the user will be in a position to replace the entire device or the used cake immediately upon indication by the device that the cake has completely evaporated.

Another feature is that the empty or replacement signal and the nearly empty or warning signal referred to above involve the use of printed legends which prominently and definitely indicate these conditions to the user.

An additional feature is that the complete device as manufactured and presented for sale comprises a moisture-proof and air-proof packaged article having an air and moisture impervious and preferably transparent external wrapper, which wrapper serves to prevent evaporation of the chemical cake and to protect the device, but is readily removable to expose the cake to the atmosphere when the device is put in use. The means which are provided for supporting or hanging up the device when in use are made foldable for convenience in wrapping or packaging as just described.

Another purpose is to provide a device of the type described which is of simple and economical construction so that it may be readily and cheaply manufactured and thus be sold at a relatively low price.

Other objects will be apparent from the following detailed description when considered in connection with the accompanying drawings, wherein:

Figure 1 is a central vertical sectional view of the preferred form of my improved chemical evaporator as it appears originally in use suspended from a rod, the device including inner and outer containers carried by the chemical cake therein;

Figure 2 is a front perspective view of the device after the outer container has dropped off, due to nearly complete evaporation of the cake, to display the warning notice;

Figure 3 is a front perspective view of the complete device of Fig. 1 in its original condition as it is manufactured for shipping and sale purposes and before it is put into use, the supporting means being folded against the evaporator and the whole encased and sealed in a transparent wrapper;

Figure 4 is a central vertical sectional view of a modified form of the evaporator as it appears originally in use suspended from a rod, the device including a single container carried by the cake, a warning notice tag and an empty notice tag;

Figure 5 is a perspective view from the rear of the device as shown in Fig. 4.

Figure 6 is a fragmentary top view of the container showing the slot therein which receives the suspending means;

Figure 7 is a similar bottom view showing the slot in the container which receives the warning tag supporting means;

Figure 8 is a front elevation of the modified device after the warning tag has dropped into its signalling or operative position as a result of nearly complete evaporation of the cake;

Figure 9 is a front elevation of the device after the container has fallen therefrom to display the empty notice tag; and Figure 10 is a front perspective of the complete device of Figs. 4 and 5 in its original condition as presented for sale and display, the suspending means being folded down and the whole encased in an impervious, transparent wrapper.

The invention, as stated, may be applied to chemical evaporators for insecticidal, fumigating, deodorizing, disinfecting and like purposes. Hence the chemical composition of the evaporable cake employed in the device depends upon the purpose for which the evaporator is to be used. By way of example, the invention is described in detail hereinafter as applied to a moth exterminating device adapted to be hung up in a clothes closet or other space to be protected or treated.

The preferred construction of the evaporator shown in Figs. 1 to 3 will be described first. Referring particularly to Figs. 1 and 2 showing the device as it appears hung up in use and especially to Fig. 1 which shows it when first put in use, it will be seen that this form of the device includes an inner, open-bottom, rectangular container 11, an evaporable chemical cake 12 mounted in container 11, and an outer, open-top, rectangular container 13 in which the inner container 11 is arranged in freely telescoping relation; also suspension means for the evaporator which are described later. Containers 11 and 13 may be made of tin, cardboard, paper or other suitable material. Cake 12 is molded from any suitable chemical compound which readily evaporates upon exposure to the air to produce the desired fumes. When the device is used as a moth exterminator, a cake of paradichlorobenzene is preferably employed as most effective.

Inner container 11 of the device includes top wall 14, front wall 16, rear wall 17, and side walls 18, 19. Side walls 18 and 19 are provided with vertically-extending, open-bottom ventilating slots 18', 19', respectively. These slots extend from the open bottom of inner container 11 to a level located at a relatively short distance from the top 14 of the container.

As shown in Fig. 1, the original volume and shape of chemical cake 12 is such that upper portion 21 thereof, which is rectangular in horizontal section, fits tightly in the upper closed portion 11' of inner container 11 and thus holds the cake against top wall 14 of the container. This arrangement retards evaporation of the upper part of the cake by closely encasing and protecting the same. Lower face 22 of cake 12 is spaced somewhat from the open bottom of inner container 11, while sides 23, 23 of lower portion 24 of the cake are inclined downwardly and inwardly beginning at a level approximating that of the upper ends of slots 18', 19' and extending to the lower face of the cake. This provides ventilating spaces 26, 27 between the sides of the cake and side walls 18, 19, respectively, of the inner container, and also a communicating ventilating space 28 between lower face 22 of the cake and the open bottom of the inner container.

Outer container 13 includes front wall 29, rear wall 30, bottom wall 31 and side walls 32, 33. The outer surfaces of the front, back and side walls of the container provide adequately for the display thereon of any desired identifying, advertising, instructive or other matter. Outer container 13 is taller than inner container 11. Space 34 is thus provided between top wall 14 of the inner container and the open top of outer container 13. Bottom 31 of the outer container has a plurality of vent apertures 31' opening into ventilating space 28. Side wall 32 of the outer container is provided with a plurality of vent apertures 32' arranged opposite slot 18' in side wall 18 of the inner container, while wall 33 of the outer container has a plurality of similar vent apertures 33' arranged opposite slot 19' in side wall 19 of the inner container. This places ventilating spaces 26 and 27 in communication with the exterior of the device. Thus, when the vaporizer is in use as shown in Fig. 1, communicating vent apertures 31', 32', 33', vent slots 18', 19' and ventilating spaces 26, 27 and 28 provide for free circulation of the outside air into contact with the chemical cake to cause vaporization thereof and also permit ready escape of the resulting fumes into the surrounding space.

Top wall 14 of inner container 11 has a small centrally located opening 14' therein. Extending freely but snugly through this opening is a metal-wire supporting member 36 having an eye 37 located above container top 14, while the lower part of member 36 including its bent end 36' is rigidly embedded centrally in the upper portion of chemical cake 12. Eye 37 of member 36 engages container top 14 to aid in holding the cake in place. A link 38 is pivotally connected to eye 37 by an eye 39 on the lower end of the link. Another eye 40 on the other end of the link pivotally connects the link to an eye 41 on a transversely-disposed hook member 42. Hook 42 serves as a suitable means whereby the device may be suspended from a convenient object while in use, such for instance, as a clothes supporting rod 43 in a clothes closet or other clothes storing space as illustrated.

As shown in Fig. 1, an elongated metal wire member 44 is embedded centrally in the lower portion of cake 12 in line with supporting member 36. Member 44 has an upper bent end 44' which terminates approximately on a level with the lower bent end 36' of member 36, this level or horizontal plane being indicated by the dot-and-dash line A—B. Member 44 projects from the bottom of cake 12 and extends through one of the vent openings 31' in outer container 13. Lower end 45 of member 44 is bent against the bottom 31 of the outer container and thus serves to support the latter in loose telescoping relation with the inner container as illustrated.

Thus, as is clear from Fig. 1, outer container 13 and member 44 are supported on and connected to the evaporator device entirely by the chemical cake. Similarly, inner container 11 is supported from and connected to supporting or suspension means, which comprise member 36, link 38 and hook 42, solely by means of the chemical cake. As a matter of fact, the suspension means are connected to and support the remainder of the device solely by means of the cake 12.

With the described arrangement, use of the device results, due to evaporation, in gradual physical reduction or dissipation of the body of cake 12 from its bottom upwardly and inwardly. When the cake evaporates or disappears up to line A—B or at least approximately to this line, the cake is closely approaching complete evaporation or exhaustion and therefore, due to the relatively small portion of the original volume of the cake remaining, will continue to supply protective fumes only for a relatively short additional period.

At the above stage of evaporation of the cake, member 44 will be released by the cake. As a result, member 44 and outer container 13 fall from the device to the floor due to the weight of these parts and the loose fit between the inner and outer containers, and leave the evaporator in the condition shown in Fig. 2. The presence of outer container 13 on the floor serves as a definite and readily observed preliminary or warning notice to the user that the chemical cake in the evaporator is almost completely exhausted and hence replacement will be necessary shortly. Front wall 16 of inner container 11 bears a prominent printed legend 46 which includes a warning notice indicating that the evaporator is almost empty, i. e., that the cake is almost completely evaporated. Legend 46, being exposed to view when outer container 13 drops off, serves as an additional preliminary or warning notice to the user. Legend 46 also indicates that replacement should be effected immediately when the inner container falls.

After outer container 13 falls, evaporation of cake 12 continues until finally it has evaporated from and released member 36 and the entire cake has evaporated and disappeared. As soon as this takes place, inner container 11, being thus freed of its sole connection with the supporting means, drops off of supporting member 36 onto the floor. The presence of only the supporting means suspended from rod 43 serves as a definite and readily observable notice to the user that the chemical cake is completely exhausted, and hence immediate replacement is necessary. An additional readily-observed empty or replacement notice is afforded the user by the presence of inner container 11 on the floor, particularly since legend 46 thereon indicates that replacement should be effected immediately.

It will be clear that the central location of member 44 in cake 12 and also the distance member 44 extends upwardly into the cake, or in other words the distance between end 44' of member 44 and the top surface of the cake, predetermine the extent of evaporation and physical reduction of the cake necessary to release member 44 to give the warning notice and thus also determine the volume of cake remaining in the evaporator when the warning is given, thereby controlling the time which elapses between the warning and empty notices. Obviously, by changing the length of member 44 and the distance it extends upwardly into the cake, the volume of cake remaining when the warning is given, and consequently the time interval between the warning and empty notices, may be varied as desired.

Preferably an entire new evaporator with another cake therein is hung up when cake 12 is completely exhausted and inner container 11 has fallen. However, in the event it should be desired to market the evaporator as a refill-type device, outer container 13 could be retained by the user after it has dropped. Then, when cake 12 has completely evaporated, the old container 13 could be assembled by the user with a new refill unit comprising inner container 11, cake 12, member 44 and suspension members 36, 38 and 42, all assembled as shown in Fig. 1, except end 45 of member 44 would be straight. The user would simply insert the described refill unit into outer container 13 and bent over end 45 of member 44 to connect the inner and outer containers together as shown in Fig. 1, whereupon the device would be ready for use.

The complete evaporator as manufactured for sale and before being put into use is shown in Fig. 3. The suspension means are folded into space 34 against top 14 of inner container 11, and the device completely encased in a moisture-proof and air-proof wrapper 47. This wrapper consists of a rectangular sheet of wrapping material which is impervious to moisture and air and also preferably is transparent. Any suitable wrapping material may be used, but preferably a cellulose product, such as waxed paper or the material commonly known as "Cellophane," is employed. Sheet 47 is wrapped snugly about the rest of the device in a conventional manner to form an overlapping seam 47', and folded portions 48, 48 and folded flaps 49, 49 at each side of the evaporator. The packaged article thus formed is rendered completely moisture-proof and air-proof by sealing together the marginal portions of the wrapper at seam 47', and sealing flaps 49, 49 together and to the underlying wrapper portions 48, 48 at each side of the package. This sealing may be effected in any suitable manner as by applying an adhesive to cause the portions of the wrapper to adhere together, or such adherence may be accomplished by application of heat.

Sealed wrapper 47 ensures that no evaporation of cake 12 will take place before the device is used. When the evaporator is to be put into use the wrapper is readily torn off, thereby exposing the cake to the atmosphere through the various vent openings so that the desired fumes will be given off when the device is hung up in the space to be protected. While in place, wrapper 47 protects the rest of the evaporator device and, being transparent, exposes to view any matter which may be placed on outer container 13 for display purposes.

In describing the modified evaporator of Figs. 4 to 10, particular reference is had first to Figs. 4 to 9 showing the device as it appears hung up in use and especially to Figs. 4 and 5 which show it when first put in use. The evaporator includes a drum-shaped container 50 which comprises a cylindrical body 51, a fixed front cover 52 and a readily-removable rear cover 53. Covers 52 and 53 have peripheral flanges 52' and 53', respectively, whereby the covers fit snugly on and close the ends of container body 51. Container body 51 and covers 52, 53 may be made of tin, cardboard, paper or other suitable material.

Located in container 50 is an evaporable chemical cake 54 shown in Fig. 4 in its original volume and shape before evaporation begins. This cake comprises a rear or base portion 55 of cylindrical form having a rear face 55' and a front tapered portion 56 having a front face 56'.

The rod on which the evaporator is hung is shown at 57. Mounted thereon is a metal-wire supporting member 58 having a hook portion 58', a shank 58" and an eye 59 at its lower end. Hook portion 58' extends lengthwise of container 50, i. e., in the direction of the axis of the container, for a purpose which appears later. A hook-shaped supporting member 60 has its body portion 60' located above container 50 and extending lengthwise thereof. At its forward end, body portion 60' has an eye 61 which is located substantially midway between front cover 52 and rear cover 53 and pivotally connects with eye 59 on hook 58. Member 60 has a forwardly-inclined leg 62 arranged at an acute angle to its body portion 60' and depending vertically from the rear end thereof.

At its uppermost portion, container body 51 has a narrow, longitudinally-extending slot 63 opening onto its rear edge 64 (see Fig. 6 particularly). As shown in Fig. 4, flange 53' of rear cover 53 coacts with slot 63 to form a small aperture 63' which is elongated slightly lengthwise of the container. Leg 62 of member 60 extends freely but snugly through aperture 63'. Within the container, leg 62 is rigidly embedded in a radial position in the upper part of rear cylindrical portion 55 of cake 54 and extends somewhat into tapered portion 56 thereof. Thus, members 58 and 60, which constitute the supporting means for the device, are directly connected to and support the chemical cake independently of the rest of the device. The described form and arrangement of member 60 causes the device to hang in the vertical position of Fig. 4.

Container 50 is supported from and connected to the above-mentioned supporting means solely by means of cake 54 as will now be pointed out. The cake, as appears in Fig. 4, is located in the container with its rear face 55' in contact with rear cover 53, while front face 56' of the cake is spaced somewhat from front cover 52 to form a ventilating space 65. The container bears directly upon and is supported by the uppermost part 66 of cylindrical portion 55 of the cake. Inner closed end 67 of slot 63 engages inclined leg 62 of supporting member 60 and thus maintains contact between rear cover 53 and rear face 55' of the cake and also the ventilating space 65 at the front of the cake.

The diameter of cylindrical portion 55 of the cake is somewhat smaller than the internal diameter of container 50 so that, when the device is suspended in place as shown in Fig. 4, an upright arcuate ventilating space 68 is provided between the interior of the container and cylindrical cake portion 55. This is shown clearly in Fig. 8 wherein the cake is indicated in dotted lines in its original form. Ventilating space 68 is thus widest at its lowermost portion 69, from which latter its side portions 68', 68" gradually taper to its closed ends at the uppermost portion 66 of the cake. An annular ventilating space 70 surrounds tapered portion 56 of the cake. Thus, ventilating spaces 65, 68 and 70 all communicate with each other. In order to place these ventilating spaces in free communication with the outside atmosphere to effect evaporation of the cake and permit ready escape of the fumes, the uppermost portion of container body 51 has a plurality of vent apertures 71, while the container body at one side of its lowermost portion has a plurality of vent apertures 72 and at the opposite side thereof a corresponding plurality of vent apertures 73.

Diametrically opposite slot 63, container body 51 is formed at its lowermost portion with a similar slot 74 which opens onto its rear edge 64 (see Fig. 7 particularly). Cover flange 53' coacts with this slot to form a small aperture 74' elongated somewhat lengthwise of the container. As shown in Fig. 4, a vertical metal-wire, warning-tag supporting member 75 is rigidly embedded in a diametrical position in cylindrical portion 55 of the cake. The upper end of member 75, which is located somewhat above the level of the lower end of leg 62 of member 60 and between leg 62 and cover 53, is bent to form a horizontal portion 76 and a vertical portion 76' at the rear face of the cake. Members 75 and 60 are disposed in a single plane, in which also are located the longitudinal axes of cake 54 and container 50 as shown in Fig. 8, wherein member 75 is indicated in dotted lines in its original in operative position of Fig. 4. The lower end of member 75 depends from the cake and extends freely through opening 74'. Below the container, member 75 is bent to form a horizontal end portion 77 underlying cover flange 53', and a vertical end portion 77' overlapping rear cover 53.

Originally mounted on the outside of rear cover 53, as shown in Figs. 4 and 5, are an inner warning-notice tag 78 and an outer empty-notice tag 79. These tags, which preferably are of paper or light cardboard, are elongated in form and arranged vertically in overlapping relation diametrically of container 50. Tag 78, which is shorter than tag 79 and arranged in a normal inverted or inoperative non-signalling position, is located adjacent rear cover 53 and slidably held thereagainst by tag 79. Upper edge 80 of tag 78 is curved to conform to the periphery of cover 53 and lower edge 81 of the tag is also curved. A bent tab 82 on upper edge 80 of tag 78 extends slightly beneath the container. Tab 82 has an opening 82' therein through which end portion 77 of member 75 freely extends to support tag 78 in place.

The front face of tag 78 bears a prominently printed legend 83 (Fig. 8), while its rear face bears a similar legend 84 (Fig. 5). Each legend includes a warning notice indicating that the evaporator is almost empty, that is, the chemical cake is nearly completely evaporated. Legend 83 also indicates that replacement should be effected when the device is empty. Legend 84 also indicates this action should be taken when the empty signal is displayed. As shown in Figs. 4 and 5, legends 83 and 84 are inverted and concealed from view by the container and empty tag 79.

Empty tag 79, which extends entirely across cover 53, has its upper edge 85 and its lower edge 86 curved to conform to the periphery of cover 53. Empty tag 79, which is the same width as warning tag 78, is superposed upon tag 78 so as to completely cover the same and aid in holding it in the non-signalling position of Figs. 4 and 5 due to friction between the tags. The lower end of tag 79 is slidably secured between end portion 77' of member 75 and tag 78. An elongated tab 87 is provided to support and secure tag 79 at its upper end. The tag is bent at 88 so that inner portion 89 of tab 87 engages cover flange 53'. Tab 87 is reversely bent at 90 to provide an inclined end portion 91. Supporting member 60 extends through openings 89' and 91' in tab 87. Both of these openings are slightly elongated lengthwise of container 50, while leg 62 of member 60 engages the forward end of opening 89' to hold tag 79 in proper position.

In securing the upper and lower ends of tag 79 to the container in the manner just described, the parts involved are proportioned and arranged so that, while tag 79 is held in place and in turn maintains tag 78 in place as stated, sufficient looseness is provided between the parts so as not to interfere with downward movement of member 75 and its withdrawal of tag 78 from between tag 79 and cover 53 when cake 54 releases member 75 as described later.

The front face of tag 79 bears a prominently printed legend 92 (see Fig. 9) which includes a notice indicating the device is empty and replacement should be made immediately. Since, as shown in Figs. 4 and 5, the front face of tag 79 is normally concealed by container 50, legend 92 on the tag is normally concealed from view.

With the described arrangement of Figs. 4 and 5, use of the device will result in evaporation and gradual physical reduction of cake 54 in a generally upward and rearward direction and also inwardly. Due to the protective action of rear cover 53 and of container body 51 where it rests on the top of the cake and the restricted air circulation in portions 68', 68'' of ventilating space 68, the upper part of cylindrical portion 55 of the cake will be the last to evaporate. For the same reasons, the uppermost part 66 of the cake, in which leg 62 of member 60 is embedded and which is located at a higher level than the upper end of member 75, will be the very last part of the cake to disappear.

As the above described evaporation and reduction of the cake takes place, member 75 is gradually uncovered from its lower portion upwardly until finally, when evaporation reaches the top of member 75, this member is completely released. Since only uppermost portion 66 of the cake remains at this time, it will be noted that the cake is nearly completely exhausted. When released, member 75 drops downwardly in opening 74', due to its weight, and at the same time draws warning tag 78 downwardly between tag 79 and the container. As a result, member 75 falls into its operative signalling position shown in full lines in Fig. 8 with its end portion 76 resting in slot 74, thus preventing the member from becoming detached from the container. At the same time, tag 78 is completely withdrawn by member 75, whereupon it swings about portion 77 of this member into its upright signalling position of Fig. 8. The warning signal means, comprising member 75 and tag 78, it will be noted, were supported in the non-signalling position of Fig. 4 solely by the chemical cake.

The presence of tag 78 in its signalling position as the device appears in Fig. 8 serves as a readily observed warning signal that the evaporator is nearly empty. Particularly is this true since legends 83 and 84 indicating this condition are prominently displayed on the front and back of the tag.

Following the warning signal, evaporation of the cake continues until it has evaporated from and released leg 62 and the only remaining part 66 of the cake has disappeared. When this occurs, container 50 being thus freed of its sole connection with the supporting means drops off of supporting member 60 onto the floor. This leaves the device in the condition of Fig. 9 with empty tag 79 suspended from the supporting means. The presence of only these parts suspended from rod 57 serves as a readily observed notice that the evaporator is empty and replacement should be effected, especially since legend 92 to this effect is prominently displayed by tag 79. An additional readily observed empty or replacement notice is furnished the user by the presence of container 50 and attached tag 78 on the floor, particularly since legends 83 and 84 on tag 78 indicate that replacement should be made.

The central location of member 75 in cake 54 with its upper end extending to the rear face of the cake and the distance member 75 extends upwardly into the cake regulate the volume of the cake body which remains in the container when the warning signal is given, or in other words the size of cake part 66. Thus the time elapsing between the warning and empty signals is controlled. By changing the distance member 75 extends upwardly into the cake, the volume of cake part 66 may be changed and the interval between the warning and empty signals thereby varied.

Preferably an entirely new evaporator with another cake therein is hung up when container 50 falls and empty tag 79 is displayed. Should it be desired to market the evaporator as a refill-type device, container body 51 with front cover 52 could be retained by the user following removal of rear cover 53 and the attached warning means, viz., tag 78 and member 75. Container body 51 with its cover 52 could then be assembled by the user with a new refill unit comprising rear cover 53, cake 54, suspension members 58, 60, tags 78, 79 and member 75, all assembled as shown in Figs. 4 and 5 with the tags and members 60 and 75 securing the cake in place on cover 53. This unit would simply be inserted into container body 51 as indicated in Fig. 4, such insertion being permitted by slots 63 and 74 which receive members 60 and 75, respectively, and by the annular space provided between flange 53' of cover 53 and the cake, due to the smaller diameter of the latter, and which receives container body 51. During this operation, eye 61 of member 60 slides along the outside of container 50 and stops above vent aperture 71'. The device is now ready for use.

Fig. 10 shows the modified device as manufactured and prepared for sale. Supporting hook 58, which is curved originally, is folded down so that it fits against the outside of container 50 as shown in full lines in Fig. 10 (indicated in dotted lines in Fig. 8). Tags 78 and 79 and members 60 and 75 permit limited up and down movement of cake 54 in the container, during which leg 62 of member 60 moves freely in elongated slots 63' and 89' in the container and tab 87, respectively. Thus, when the device is not suspended and is in the position of Fig. 10, the cake descends in the container so that body portion 60' of member 60 bears on tab 87 of empty tag 79 and eye 61 of member 60 descends partially into vent aperture 71' as shown in Fig. 10. This draws eye 59 of hook 58 partly into the aperture whereby the curved hook fits more snugly against the container.

As shown in Fig. 10, the device is completely encased in a moisture-proof, air-proof and preferably transparent wrapper 94 similar to wrapper 47 of Fig. 3. This wrapper consists of a rectangular sheet which is wrapped about the rest of the evaporator so that the marginal portions of the sheet are all formed at the front of the device into a radiating series of flat, overlapping folds 95. This packaged article is then rendered completely moisture-proof and air-proof by suitably sealing together overlapping folds 95.

When ready for use, wrapper 94 is torn off, hook 58 raised and preferably bent straight, and the device hung up by its suspension means. As a result, the parts will assume their positions of Figs. 4 and 5 with container 50 supported solely from uppermost portion 66 of the cake. In order to minimize vaporization therethrough of cake portion 66, aperture 63' in container 50 is made only sufficiently large to permit free movement of leg 62 of member 60 therethrough as described.

Obviously various changes may be made without departing from the invention disclosed, except as the same may be limited by the appended claims.

What is claimed is:

1. A chemical evaporator comprising a container having an aperture in its top and venting means; an evaporable chemical cake located entirely within said container; and external suspension means for the evaporator, the lower part of the suspension means, which comprises a smooth-surfaced rod-like portion extending through the aperture in the container, being embedded in the top portion of the cake and the suspension means being connected to the container only by means of the cake, said aperture being of a size to freely but snugly receive said part of the suspension means and permit gravity separation of the container therefrom only when the cake has completely evaporated from the suspension means, the construction and arrangement of the container, the venting means and the cake being such that the container will so protect said top portion of the cake from exposure that said portion will evaporate last, whereby when the evaporator is hung from an object by said suspension means, the container will be supported by said top cake portion and also supported solely by the cake so that only complete evaporation of the cake including said cake portion will release the container and thus cause the container automatically to fall from the suspension means entirely due to the weight of the container to thereby indicate complete evaporation of the cake.

2. A chemical evaporator comprising a container having venting means; an evaporable chemical cake located in said container; suspension means for the evaporator; and normally stationary gravity-type signal means for indicating evaporation of the cake, said signal means being adapted for sudden movement from a stationary non-signalling position to a signalling position and being embedded in the cake to normally hold the signal means in non-signalling position, whereby upon suspension of the evaporator by said suspension means in use, evaporation of the cake will release the signal means and thus cause sudden gravitation of the same into signalling position, said signal means being exposed permanently to view upon its movement to signalling position.

3. A chemical evaporator comprising an inner container having an aperture in its top wall; an outer open-top container in which the inner container is arranged in loosely telescoping relation, said containers having communicating venting means; an evaporable chemical cake located in the inner container with an upper portion thereof, which constitutes a relatively small part of the cake, so encased by said container that it will evaporate last; means connecting the outer container to the cake, said connecting means being so embedded in the remaining larger portion of the cake as to be released when said larger portion completely evaporates; and external suspension means for the evaporator, said suspension means extending freely through said aperture in the inner container and being so embedded in said small cake portion as to connect the inner container to the suspension means and permit separation thereof when said small cake portion evaporates, whereby upon suspension of the evaporator by said suspension means said containers will be supported by the cake so that complete evaporation of the cake will first cause the outer container to fall from the evaporator to indicate nearly complete exhaustion of the cake and then the inner container to fall therefrom to indicate complete exhaustion of the cake.

4. A chemical evaporator as claimed in claim 3 wherein said suspension means are foldable; and wherein said inner container is shorter than the outer container and located in the latter so as to provide a space between the top of the inner container and the top of the outer container to receive the foldable suspension means.

5. A chemical evaporator as claimed in claim 3 wherein the inner container bears a legend indicating that the cake is nearly completely evaporated and that replacement thereof should be effected when the inner container falls, said legend normally being concealed by the outer container but adapted to be revealed when the outer container falls.

6. A chemical evaporator comprising an open-bottom container having a top wall with a centrally-located aperture therein, said container being rectangular in horizontal section and having in opposed side walls thereof open-bottom venting slots which extend from the bottom of the container to a level a relatively short distance from the container top; an evaporable chemical cake located in said container and having a top portion of relatively small volume which is rectangular in horizontal section and fits tightly in the upper part of said container against the top wall thereof; and external suspension means for the evaporator including a supporting member having an eye portion engaging the outside of the container, said member extending through the aperture in the container and being embedded in said cake portion to connect the container to the suspension means, said aperture being of a size to freely but snugly receive said member and permit separation of the container therefrom when the cake has evaporated from the member, while the container protects said cake portion so that it will evaporate last, whereby when the evaporator in use is hung from an object by said suspension means, the container will be supported by said cake portion so that evaporation thereof will cause the container to fall from the evaporator to indicate complete evaporation of the cake.

7. A chemical evaporator as claimed in claim 6 wherein there is provided an open-top, closed-bottom outer container of rectangular horizontal section in which said first-mentioned container is located in loosely telescoping relation, the side and bottom walls of the outer container having venting apertures communicating with said slots and the open-bottom of the inner container, respectively; and wherein an upright connecting member is centrally embedded in the lower portion of the cake with its upper end located adjacent said top cake portion and its lower end depending from the cake and connected to the outer container, whereby evaporation of the cake in use will release the connecting member and permit the outer container to fall from the evaporator to indicate nearly complete exhaustion of the cake.

8. A chemical evaporator comprising a container having venting means, an upper aperture and a lower aperture; an evaporable chemical cake located in said container and including an upper portion which constitutes a relatively small part of the cake, said container having a portion for so encasing said small cake portion that it will evaporate last; external suspension means for the evaporator extending freely through said upper aperture in the container and being so embedded in said small cake portion as to connect the container to the suspension means and permit separation thereof when said small cake portion evaporates; gravity-type signal means including a warning tag normaly located adjacent the outside of a side wall of the container and a supporting member connected to the tag externally of the container, said member extending freely through said lower aperture in the container and normally having its upper portion so embedded in the remaining larger portion of the cake as to be released when said larger portion completely evaporates, the signal means being adapted in use for gravitational movement from said normal or non-signalling position in which it is held by the cake to a signalling position in which the warning tag is suspended from the container by the supporting member; means for preventing separation of the container and the signal means when the latter moves to signalling position; and means for frictionally holding the tag in normal position, whereby upon suspension of the evaporator by said suspension means, the container will be supported by the cake and complete evaporation of the cake will first cause gravitation of said supporting member to withdraw the warning tag from the frictional holding means and move the signal means into signalling position to indicate nearly complete exhaustion of the cake, and then cause the container and signal means to fall from the evaporator to indicate complete exhaustion of the cake.

9. A chemical evaporator as claimed in claim 8 wherein said frictional holding means for the warning tag comprises a second tag permanently attached at its upper end to the suspension means and overlying the warning tag, said second tag having a legend on its normally concealed inner face indicating that the cake is completely exhausted; wherein said warning tag supporting member is pivotally connected to an end of the warning tag at the bottom of the container and has a portion slidably engaging the lower end of said second tag to aid in holding said tag in place; and wherein the warning tag bears a legend indicating that the cake is nearly completely exhausted, the warning tag and its legend being inverted and said legend concealed by the evaporator when said tag is in its normal position, whereby when the warning tag is withdrawn from its frictional holding means in moving to signalling position, said tag will swing into upright position and reveal said legend thereon, and whereby when the container falls, said second tag will remain on the suspension means and said legend thereon will be revealed.

10. A chemical evaporator comprising a container having venting means and an aperture; an evaporable chemical cake located in said container; external suspension means for the evaporator, said suspension means, which extends through the aperture in the container, being embedded in only a relatively small portion of said cake and connected to the container solely by means of the cake, said aperture being of a size to freely but snugly receive the suspension means and permit gravity separation of the container therefrom only when the cake has completely evaporated from the suspension means, and said container so protecting said small portion of the cake from exposure that it will evaporate last, whereby when the evaporator in use is hung from an object by said suspension means, the container will be supported by said cake portion and also supported solely by the cake so that only complete evaporation of the cake including said cake portion will release the container and thus cause the container automatically to fall from the suspension means entirely due to the weight of the container thereby to indicate complete evaporation of the cake; and normally stationary gravity-type warning signal means, said signal means being normally held in a non-signalling position by means of the cake but adapted for release therefrom to permit movement of the signal means upon nearly complete evaporation of the cake, the signal means when so reelased being movable automatically away from non-signalling position entirely due to the weight of the signal means to thereby indicate nearly complete evaporation of the cake.

11. A chemical evaporator comprising a container having venting means; an evaporable chemical cake located in said container; external suspension means for the evaporator, said suspension means being connected to the cake and to the container solely by means of the cake, whereby when the evaporator in use is hung from an object by said suspension means, the container will be supported only by the cake and so supported thereby that substantially complete evaporation of the cake will release the container and thus permit it to fall from the evaporator to thereby indicate that the evaporator is empty; and a tag permanently attached to the suspension means, said tag having a legend on a face thereof normally concealed by the container and indicating that the evaporator is empty, whereby when the container falls, the tag will remain on the suspension means and said legend will be revealed.

12. In a chemical evaporator, a container having venting means; an evaporable chemical cake located in said container, said cake consisting of a relatively small upper portion which is adapted to evaporate last and a relatively larger remaining lower portion which is adapted to evaporate first when the device is used; means connecting said container to the cake, said connecting means being so embedded in said larger lower portion of the cake as to be released when said larger portion completely evaporates and thereby releases the container; and suspension means for the evaporator, whereby upon suspension of the evaporator by said suspension means in use, the container will be supported by the cake so that complete evaporation of only said larger lower portion of the cake will release said container and cause the same to fall from the evaporator to thereby indicate nearly complete exhaustion of the cake.

13. A chemical evaporator comprising a container having venting means; an evaporable chemical cake located in said container; external suspension means for the evaporator, said suspension means being connected to the cake and to the container solely by means of the cake, whereby when the evaporator in use is hung from an object by said suspension means, the container will be supported only by the cake and so supported thereby that only complete evaporation of the cake will release the container and thus cause the container automatically to fall from the evaporator entirely due to the weight of the container to thereby indicate that the evaporator is empty; and normally stationary gravity-type warning signal means, said signal means being normally held in a non-signalling position by means of the cake but adapted for release therefrom to permit movement of the signal means upon nearly complete evaporation of the cake, the signal means when so released being movable automatically away from non-signalling position entirely due to the weight of the signal means to thereby indicate nearly complete evaporation of the cake.

THOMAS W. KIRKMAN.